(12) United States Patent
Sherman et al.

(10) Patent No.: US 11,787,752 B2
(45) Date of Patent: Oct. 17, 2023

(54) HIGH DENSITY HYBRID ROCKET MOTOR

(71) Applicant: TERVES, LLC, Euclid, OH (US)

(72) Inventors: Andrew J. Sherman, Mentor, OH (US); Brian Werry, Euclid, OH (US); Andrew Cortopassi, Euclid, OH (US); Eric Boyer, Euclid, OH (US)

(73) Assignee: TERVES, LLC, Euclid, OH (US)

( * ) Notice: Subject to any disclaimer, the term of this patent is extended or adjusted under 35 U.S.C. 154(b) by 387 days.

(21) Appl. No.: 17/208,467

(22) Filed: Mar. 22, 2021

(65) Prior Publication Data

US 2021/0387927 A1 Dec. 16, 2021

Related U.S. Application Data

(63) Continuation of application No. 15/690,515, filed on Aug. 30, 2017, now Pat. No. 11,124,464.

(60) Provisional application No. 62/385,345, filed on Sep. 9, 2016.

(51) Int. Cl.
| | |
|---|---|
| *C06B 31/28* | (2006.01) |
| *C06B 23/00* | (2006.01) |
| *F02K 9/42* | (2006.01) |
| *F02K 9/72* | (2006.01) |
| *F02K 9/24* | (2006.01) |
| *C06C 9/00* | (2006.01) |
| *C06D 5/10* | (2006.01) |
| *F02K 9/70* | (2006.01) |
| *F02K 9/26* | (2006.01) |

(52) U.S. Cl.
CPC ............ *C06B 31/28* (2013.01); *C06B 23/001* (2013.01); *C06B 23/006* (2013.01); *C06C 9/00* (2013.01); *C06D 5/10* (2013.01); *F02K 9/24* (2013.01); *F02K 9/26* (2013.01); *F02K 9/425* (2013.01); *F02K 9/70* (2013.01); *F02K 9/72* (2013.01)

(58) Field of Classification Search
None
See application file for complete search history.

(56) References Cited

U.S. PATENT DOCUMENTS

| | | | | |
|---|---|---|---|---|
| 6,125,763 A * | 10/2000 | Kline | ........................ | C06D 5/00 102/202.7 |
| 6,165,295 A * | 12/2000 | Wagaman | ............... | C06B 47/00 149/45 |
| 6,328,831 B1 * | 12/2001 | Wagaman | ............... | C06B 31/00 149/45 |
| 8,066,834 B1 * | 11/2011 | Petersen | ............... | C06B 23/007 149/76 |
| 2005/0034447 A1 * | 2/2005 | Joshi | ........................ | B64G 1/22 60/253 |
| 2014/0109788 A1 * | 4/2014 | McPherson | ............. | C06B 47/00 102/202.9 |

* cited by examiner

*Primary Examiner* — Aileen B Felton
(74) *Attorney, Agent, or Firm* — Ulmer & Berne LLP; Brian E. Turung

(57) ABSTRACT

A high density, generally recognized as safe, hybrid rocket motor is described, having a density-specific impulse similar to a solid rocket motor, with good performance approaching or equal to a liquid rocket motor. These high density hybrid motors resolve the packaging efficiency/effectiveness problems limiting the application of safe, low cost hybrid motor technology.

11 Claims, 6 Drawing Sheets

Graph A

Graph B

HIGH DENSITY HYBRID ROCKET MOTOR

The invention is a continuation of U.S. application Ser. No. 15/690,515 filed Aug. 30, 2017, which in turn claims priority on U.S. Provisional Application Ser. No. 62/385,345 filed Sep. 9, 2016, which is incorporated herein by reference.

Portions of this invention were developed and reduced to practice with the assistance of federal funds, under which the US government has certain government purpose rights pursuant to Contract number NNX15CK16P.

FIELD OF THE INVENTION

The invention relates to the field of solid fuel hybrid rocket motors. More particularly, the present invention relates to solid fuel hybrid rocket motors having both high density (above 1.3 g/cc), high regression rate fuels and high density, storable oxidizers (specific gravity >1.3 g/cc).

BACKGROUND OF THE INVENTION

Hybrid rocket motors have recently been given greater attention in the space and missile community due to their reduced cost and improved safety in storage and handling as compared to liquid and solid rocket motors. Hybrid rocket motors use solid polymeric fuels such as rubber/HTPB, wax, or acrylic as the motor grain, along with a separate liquid or gaseous oxidizer such as oxygen or nitrous oxide. Hybrid motors have the advantage of being considerably less complex (and hence cheaper) than liquid rocket motors, and are not classified as explosives as are solid rocket motors. With self-pressurizing oxidizers such as $N_2O$, very simple designs for hybrid rocket motors are possible.

A hybrid rocket motor is the same as a liquid rocket, except that the fuel exists in solid form within the chamber and the oxidizer to fuel ratio (O/F) of combustion is controlled by the regression rate of the fuel and the flow rate of oxidizer. The fuel is not a propellant in the solid rocket motor sense, but is a pure fuel that is inert without an external oxidizer. Hybrid rockets offer some very significant advantages over solid and liquid-fueled rockets such as:

Simple and inexpensive to build and store as compared to solid and liquid rocket motors.

Highly inert and insensitive; classified as a combustible solid (e.g., "wood")

Safe to handle, store and deploy.

Can be shipped via UPS and Fed-Ex.

Other than inert gas (He) pressurization (which can be conducted off-site), has no hazardous materials operations needs at the launch location.

Uses the high density fuels and oxidizers which provide maximum total thrust for a given volume, with density-Isp similar to current state of the art solid propellants.

Can be stored indefinitely, and do not pose as an explosive or hazardous materials (Other than He pressurization) hazard for storage, handling, shipping, or use.

Requires no thermal control-performance and is safety insensitive to environmental conditions from −35° C. to 50° C.

Can be shut down or throttled with appropriate control.

While hybrid rocket motors have the advantage of separating the oxidizer and fuel, and have good performance from a density point of view, current hybrid motors have very poor packing efficiencies due to low densities of the oxidizer and fuel as compared to solid rocket motors, and low regression rates for the fuels, typically one third of solid motors. The low regression rate of the fuel leads to designs requiring either very long motors or complex port geometries to achieve the required internal surface area, and large oxidizer tanks. Common storable green oxidizers such as $N_2O$ have low density, and are highly affected by temperature. Reduced performance occurs as the oxidizer/fuel ratio varies over the length of the motor, leading to incomplete burning of the fuel grain and production of slivers of unburnt fuel. More importantly, significant shifts in the oxidizer/fuel ratio occur throughout the duration of the burn as the port area continuously enlarges as the fuel is consumed, leading to reduced regression rate. A great amount of research has gone into replacing the solid rocket boosters on the Space Shuttle with hybrid motors. Unfortunately current limitations showed that hybrid motors suffer from low regression rates, which may make replacing large solid motors very difficult. Increased surface area could alleviate this problem, but leads to issues with sliver fraction over long motors.

Many limitations of hybrid motors arise from current oxidizer choices—$N_2O$ having a low and highly variable density (but self-pressurizing with thermal control), and relatively modest Isp, and liquid oxygen being low density, high pressure, and cryogenic (highly hazardous). However, HAN solutions, and OXSOL 1 in particular, solve the oxidizer problem, being high density, infinitely storable over a wide temperature range at atmospheric pressure, and providing high Isp. The other major limitation of hybrid motors is low regression rate of the fuels—producing long and complicated (wagon wheel type) grain designs with high sliver fraction (unburnt fuel).

Existing hybrid rocket motors suffer from poor density and packaging efficiency, oxidizer rich burning, limited parallel axial flow configuration, limited length of the axial channel burning, collapsing of solid rocket bodies, relatively low regression rates and limited extruded channel shapes.

These and other disadvantages are solved or reduced by the present invention.

SUMMARY OF THE INVENTION

The invention relates to the field of solid fuel hybrid rocket motors. In particular, the present invention is related to a high density hybrid rocket motor having improved volumetric performance compared to paraffin and HTPB based hybrid motors and higher regression rates as compared to HTPB to allow for efficient packaging and larger hybrid motors to be used. More particularly, the present invention relates to solid fuel hybrid rocket motors having both high density (above 1.3 g/cc), high regression rate fuels and high density, storable, green (low toxicity) oxidizers (specific gravity >1.3 g/cc).

It has been demonstrated in the present invention that the catalytic enhancement of the decomposition of Polyacetal fuels in acid-oxidizers ($N_2O$) have mass regression rates of two times (2×) or more as compared to baseline hydroxyl-terminated polybutadiene (HTPB) fuels, while also being able to achieve 50% higher density. The higher density, higher mass regression rates, and lower O/F ratios required for maximum performance (due to hydroxyl groups in the fuel) produce a very compact motor system that does not necessarily require the same complex wagon wheel grain designs of typical hybrid oxidizer-fuel combinations. In an upper stage configuration, individual propellant tubes can be used instead of the wagon wheel to produce a low sliver fraction motor.

One non-limiting aspect of the present invention is to provide a hybrid rocket motor using a room temperature storable, high density, non-toxic oxidizer. In a first non-limiting aspect of the invention, the solid fuel body and solid fuel core is created from a high density polymer containing oxygen groups in its structure. A non-limiting example of a high density fuel in accordance with the present invention includes carboxylic acids, POM (Polyoxymethylene)/Polyacytal polymers, pentaerythrital (PETA), and sorbitol, among others. A preferred fuel grain combines POM with PETA with a burning rate accelerant and metal fuel with the POM content from 50-95%. Metal fuel (e.g., aluminum, magnesium, or mixtures but also potentially titanium, boron, metal hydrides, silicon, and borides, etc. can be added to solid fuel core to increase performance and density, in amounts ranging from about 10-50 wt % (and all values and ranges therebetween). The solid core fuel contains oxygen as part of its backbone, and such solid core fuel has improved density (above 1.3 g/cc), does not form chars, and has high mass regression rate compared to HTPB. Particularly when combined with acidic species as fuel additions (e.g., addition of oxalic, stearic, citric, caprylic, capric, glucaric, valeric, lactic, benzoic, salicylic, caproic, adipic, glutaric, maleic, sebacic, cinnamic, fumaric, or other carboxylic acids), or as reactive oxidizers (e.g., fuming nitric acid, hydroxylammonium nitrate, $N_2O_2$, $N_2O_4$, MTO (methylrhenium trioxide), $H_2O_2$, etc.), decomposition can be enhanced through catalytic effects, in addition to thermal effects of normal fuel pyrolysis and burning. The high oxygen contents of the POM, PETA (Pentaerythritol triacrylate), sorbitol, and carboxylic acids can also produce relatively constant performance over a wide range of oxidizer-fuel ratios between O/F of 0.5-4, and commonly within about 5-10% of delivered ISP at O/F ratios from 1-3.5. This compares to traditional $N_2O$, and LOx hybrids using traditional paraffin and HTPB fuels requiring O/F ratios above about 3:1 to reach peak ISP. A comparison of high density versus current hybrid fuels is shown in table 1.

positions having the general composition of hydrogen peroxide, hydroxylammonium nitrate and water), were investigated by the US Navy for liquid gun propellant applications. HAN liquids, based on liquid solutions of HAN, AN (Ammonium Nitrate) and water, offer high ISP (specific impulse), and are stable in the liquid state from −30° C. to >50° C., and have low toxicity and low vapor pressure. HAN-water mixtures, such as OXSOL™, PERSOL™ (hydrogen peroxide/ammonium nitrate/water), and ANNA have demonstrated low hazard classification, and high density, making them highly effective in formulating low cost, high performance, non-toxic, safe propulsion systems. HAN-water solutions were previously investigated as an oxidizer for hybrid motors with conventional fuel grains, but was discontinued and abandoned due to ignition and stability problems. While $N_2O_2$ (and variations include MTO, etc.), as well as fuming nitric acid offer similar ISP and density performance, the HAN solutions offer much reduced hazard classifications by eliminating dangers of acid gas exposure and the need for special handling and emergency response preparations and equipment. HAN mixtures are indefinitely storable, and can be cleaned up if spilled with simple PPE (personal protection equipment).

In still another and/or alternative non-limiting aspect of the invention, an OXSOL™ liquid oxidizer is pressurized and fed into an atomizer, either using a gas-pressurized feed for smaller motors or an electrically driven turbopump for larger systems, and then into a thermally insulated precombustion chamber before a high density, high regression solid fuel grain made from a mixture of PETA, POM, acid or burning rate catalyst, and metal powder such as aluminum, magnesium, or an alloy is combined with the oxidizer. POM contents from 40-95%, PETA contents from 0-35%, and aluminum or magnesium-aluminum contents of 10-35% are acceptable, along with 0-10% carboxylic acid additions, and

TABLE 1

High-Density Binders with Conventional and Emerging Binder Systems Properties

| Binder | Density (g/cc) | Burning rate (mass) | Strength | Other |
|---|---|---|---|---|
| HTPB (Hydroxyl-terminated polybutadiene) | 0.93 | Baseline = 1 | Moderate | Castable, most common material. |
| PMMA (Poly(methyl methacrylate) | 1.17 | 0.9 | Good | Castable, generally similar to HTPB, rigid. |
| Paraffin | 0.9 | 2-3 | Poor | Castable, high regression. |
| Sorbitol | 1.49 | 1.6-2.1 | Good | Sugar alcohol, high regression rate, high density fuel with prior (Delft, Stanford) hybrid experience. |
| Polyacetal | 1.41 (delrin) | 1.7-2.5 | Excellent | acid-catalyzed decomposition, tested at PSU. |
| Polysaccharide | 1.51 | unknown (1.6-2.5 expected) | Good | Used as binder for additive manufacturing melt processable compounded with Sorbitol. |

In another and/or alternative non-limiting aspect of the invention, a high density, room temperature storable, non-toxic oxidizer is used. One non-limiting oxidizer is a HAN (hydrolxylammonium nitrate) based liquid. HAN based oxidizers, including OXSOL™ (Parachlorobenzotrifluoride) and PERHAN™ formulations (gas-generating liquid com- 0-2% burning rate accelerant such as iron nanopowder, aluminum nanopowder, Potassium dichromate ($K_2Cr_2O_7$) or ammonium dichromate (($NH_4)_2Cr_2O_7$), $Fe_2O_3$, $FeSO_4$, or potential other solid lewis acids. In aluminum and magnesium containing fuel grains, $Fe_2O_3$ or $Bi_2O_3$ additions, or PVDF (polyvinylidene difluoride), PTFE (polytetrafluoroethylene), VDF (vinylidene fluoride), THD, hexafluoroethylene, fluorinated polymers or particularly when premixed with or coated onto the metal powder, can create a thermite to enhance the burning rate and exhaust temperature, accelerating burning rate and increasing temperatures and combustion efficiencies. In some cases, the addition of small amounts, generally between 1-10% of a strained ring compound such as N,N-Dimethyl-[3]-triangulane-7-methylamine (1), cyclopropylamines (2), cyclobutylamines (3), propylamines (4), and butylamines (5) or energetic polymer such as GAP (glycidyl azide polymer), polyGlyN (glycidyl nitramine polymer), or polyNIMMO (polymer of 3-nitratomethyl-3-methyloxetane), PETN (pentaerythritol tetranitrate), RDX (hexahydro-1,3,5-trinitro-1,3,5-triazine), HMX (cyclotetramethylenetetramine), CL-20 (2,4,6,8,10,12-hexanitro-2,4,6,8,10,12-hexaazaisowurtzitane), FOX-7 (1,1-diamino-2,2-dinitroethylene), Furazan-based molecules such as diaminoazoxyfurazan, nitrocellulose, nitramine, can be used to accelerate burning rates while maintaining insensitivity.

Magnesium ribbon or powder, and other accelerants, such as thermite mixtures (Al—$Fe_2O_3$, $Bi_2O_3$—Mg,) nitrocellulose, or near-hypergolic materials such as iron sulfide, lithium, sodium or lithium aluminum hydride, lithium or sodium borohydride, etc. can be added to the preignition chamber, which accelerate heating to decompose and pre-ignite the HAN liquid sufficient to preheat the chamber to create a self-sustaining decomposition of the HAN liquid. Ignition characteristics of the HAN can be modified through the addition of small amounts of fuel, such as ammonia or hydrocarbon to control decomposition temperature. The magnesium ribbon or other high surface area metal or compound, which can be made from magnesium, aluminum, iron, titanium, zirconium, iron sulfide, magnesium nitride, (wires, ribbon, powder, or foam such as reticulated foam) or may be electrically heated or ignited to initiate the motor, as an alternative to using pyrotechnic igniters for a propulsion system having no pyrotechnics. Preloading the precombustion chamber with an electrically or otherwise easily ignited fuel is particularly effective. A reticulated or mesh resistive metal or conductive ceramic (steel wool, SiC foam, nichrome wire mesh, and similar structures) loaded with magnesium or other highly flammable or reactive metal or compound can be used to quickly and reliably ignite the hybrid motor. These can be directly added to the preignition chamber, which contains an electrically heated high surface area structure, or as a side-chamber with and electrically or optically ignitable propellant to cause the sparks to shoot into the precombustion chamber may be used for non-pyrotechnic ignition. The electrical heating and ionization potential may be used just for ignition, or can be continuous to accelerate HAN/oxidizer breakdown to improve motor internal ballistics (burning rate and stability).

In summary, the present invention is directed to a high density hybrid rocket motor utilizing a HAN-solution oxidizer with a high density, high regression rate solid fuel. The high density hybrid rocket motor includes an oxidizer storage tank containing a high density oxidizer containing water and a HAN or HAP ionic liquid and having a density of at least about 1.4 g/cc, a fuel grain fabricated from a polymeric material with a mass regression rate at least about 25% greater than HTPB, and typically at least about 50% greater than HTPB; an injector; and a pressurization and ignition arrangement; and wherein the motor exhibits stable burning within the O/F range of about 1.5-3.5, and typically within the O/F range of about 1-6 (and all values and ranges therebetween).

The high density hybrid rocket motor can use a high density polymeric fuel, wherein the fuel binder or bulk hydrocarbon contains oxygen and has a density greater than about 1.25, and typically at least about 1.35 g/cc.

The high density polymeric fuel can contain about 10-50% metal fuel additions (and all values and ranges therebetween), and typically about 10-40% metal fuel additions.

The metal fuel additions can includes one or more metals selected from the group consisting of Al, Al—Mg, Mg, $TiH_2$, and other metal fuel, including fluoro-polymer coated fuel particles from 1-20 microns in size (and all values and ranges therebetween), and preferably from 2-20 microns in size.

The high density polymeric fuel can include one or more compounds selected from the group consisting of polyacytal, sorbitol, PETA, polysaccharide, high molecular weight carboxylic acid, and other high density oxygen-containing polymer.

The high density polymer can include energetic additives such as GAP, polyGlyN, or polyNIMMO, PETN, RDX, HMX, CL-20, FOX-7, Furazan-based molecules such as diaminoazoxyfurazan, nitrocellulose, nitramine, or other energetic polymers and compounds.

The high density polymeric fuel can include an accelerator or modifier. The accelerator or modifier can include one or more compounds selected from the group consisting of PETA (pentaerythrital), iron acetylacetonate, zero valent iron, oxalic acid, and other decomposition accelerant such as ferrocene, iron oxide, potassium dichromate, or ammonium dichromate.

The high density oxidizer includes one or more compounds selected from the group consisting of AN-HAN-water mixtures, HAP-AN-water, HN, nitric acid, $N_2O_2$, MTO, and other oxidizer species. The AN-HAN-water mixture can include a decomposition control agent. The decomposition control agent can be formulated to reduce ignition temperature. The decomposition control agent can be a hydrocarbon soluble in said AN-HAN-water solution such as alcohol in concentrations of 0.5-5%. The decomposition control agent can include buffers and/or sequestering agents to increase long term stability. The buffering agent can include one or more compounds selected from the group consisting of ammonium or organic amine dihydrogen phosphates such as $NH_4 H_2 PO_4$, or diammonium or di-organic amine monohydrogen phosphates such as $(NH_4)_2 HPO_4$. The sequestering agent can include one or more compounds selected from the group consisting of phenanthroline or dipyridyl and their ring-substituted derivatives.

The high density oxidizer can be gelled. The gel can include PVA, guar gum, gelatin, or other gelling agent.

The pressurization arrangement to generate the 500-1500 psig feed pressure required can include an inert gas system; a self-pressurizing gas such as $N_2O$, $GO_x$; a mechanical diaphragm or other mechanical pressurization system; a chemical pressurization system, a traditional gas-operated turbopump, or an electric turbopump. Electric turbopumps and other electrically controllable mechanical feed systems can also be used for flow control and metering.

The high density hybrid rocket motor can include a thermally insulated precombustion chamber. The precombustion chamber can include an arrangement for heating/preheating. The arrangement for heating/preheating can include resistance wires, foams, mesh, ribbon, or other electrical heating device. These can be used for initial combustion, or to continuously add heat or electrical energy (through RF frequencies) to accelerate and/or control burning rates through oxidizer preconditioning.

The high density hybrid rocket motor can include a chemically augmented ignition system. The chemically augmented ignition system can include one or more components selected from the group consisting of catalysts, magnesium ribbon, iron sulfide, high surface area iron, titanium, zirconium powders, thermite powders such as Al—$Fe_2O_3$ mixtures, and other chemical augmentation systems.

The high density hybrid rocket motor can be operated at a pressure above about 200 psig for burning stability, and typically above about 350 psig.

The high density hybrid rocket motor can include a pressurized HAN-based oxidizer solution, (e.g., OXSOL 1™, etc.); a high density, high regression rate fuel containing one or more compounds selected from the group consisting of sorbitol, PETA, POM, and other oxygen containing high density polymer fuel having a density greater than about 1.3 g/cc; a powdered metal fuel additive dispersed in the fuel (e.g., aluminum, aluminum-magnesium alloy, etc.); and, wherein the HAN based oxidizer is atomized into a fuel grain at pressures exceeding about 200 psig, and typically exceeding about 300 psig to obtain stable combustion.

The high density hybrid rocket motor can be configured and used for upper stage propulsion.

The high density hybrid rocket motor can be configured and used for tactical missile applications.

The high density hybrid rocket motor can be configured and used for use as boost stage propulsion systems.

One non-limiting object of the present invention is the provision of provide a hybrid rocket motor using a high density fuel which has a high regression rate, and which is less sensitive to oxidizer ratio than conventional HTPB, PMMA, PE (Poly ethylene), and wax fuels.

DETAILED DESCRIPTION OF NON-LIMITING EMBODIMENTS

Figure 1:
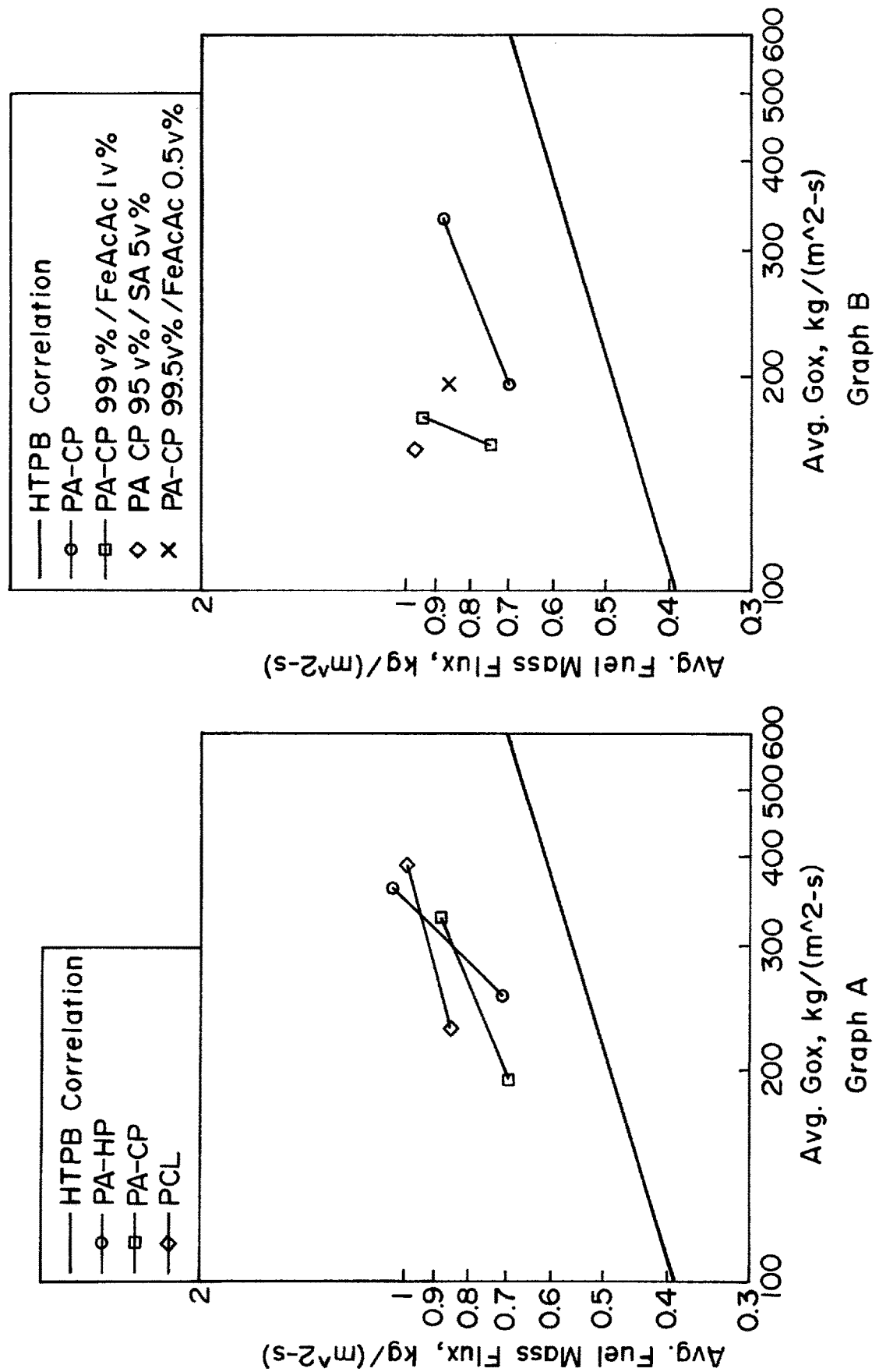
FIG. 1 illustrates two graphs directed to mass regression rates in a single port injector LGCP (long grain center perforate) hybrid test motor.
Figure 2:
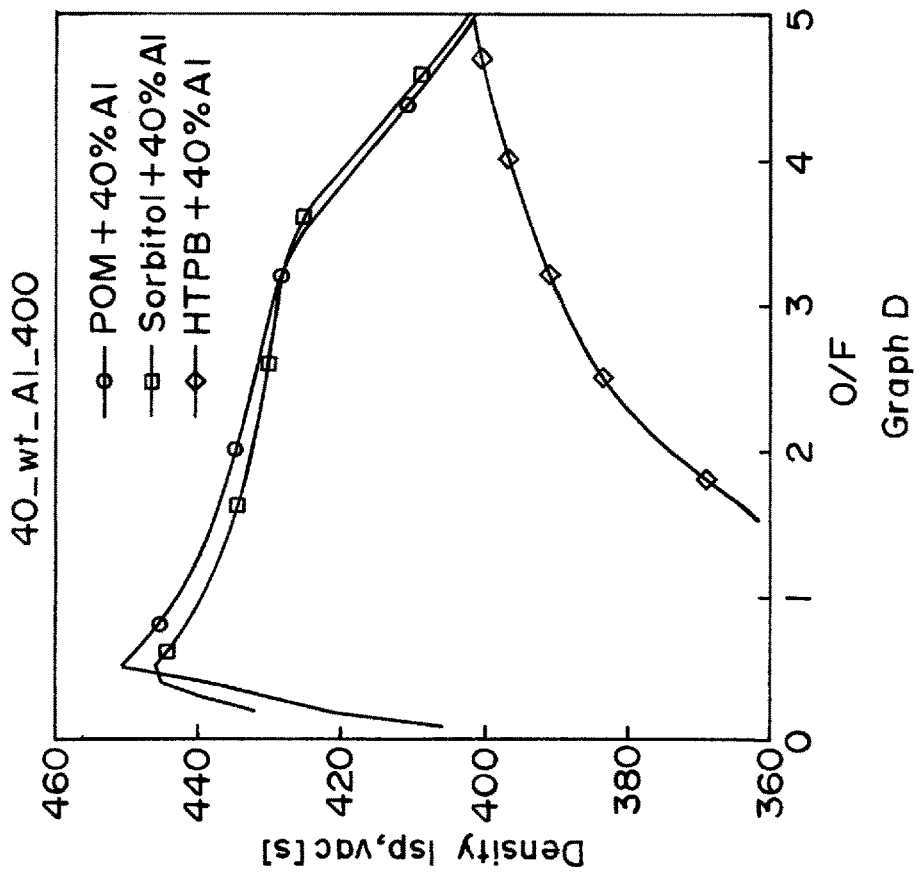
FIG. 2 illustrates two graphs directed to theoretical performance CEA (Chemical Equilibrium with Applications) specific impulse calculations for POM, Sorbitol, and HTPB fuels.
Figure 2:
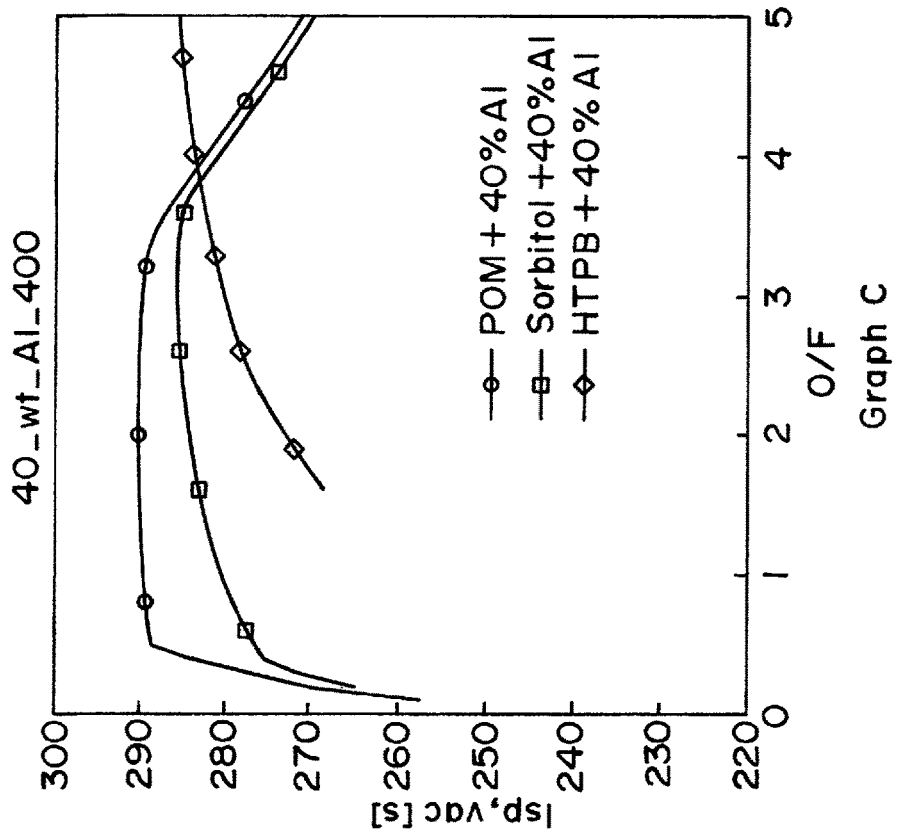
Figure 3:
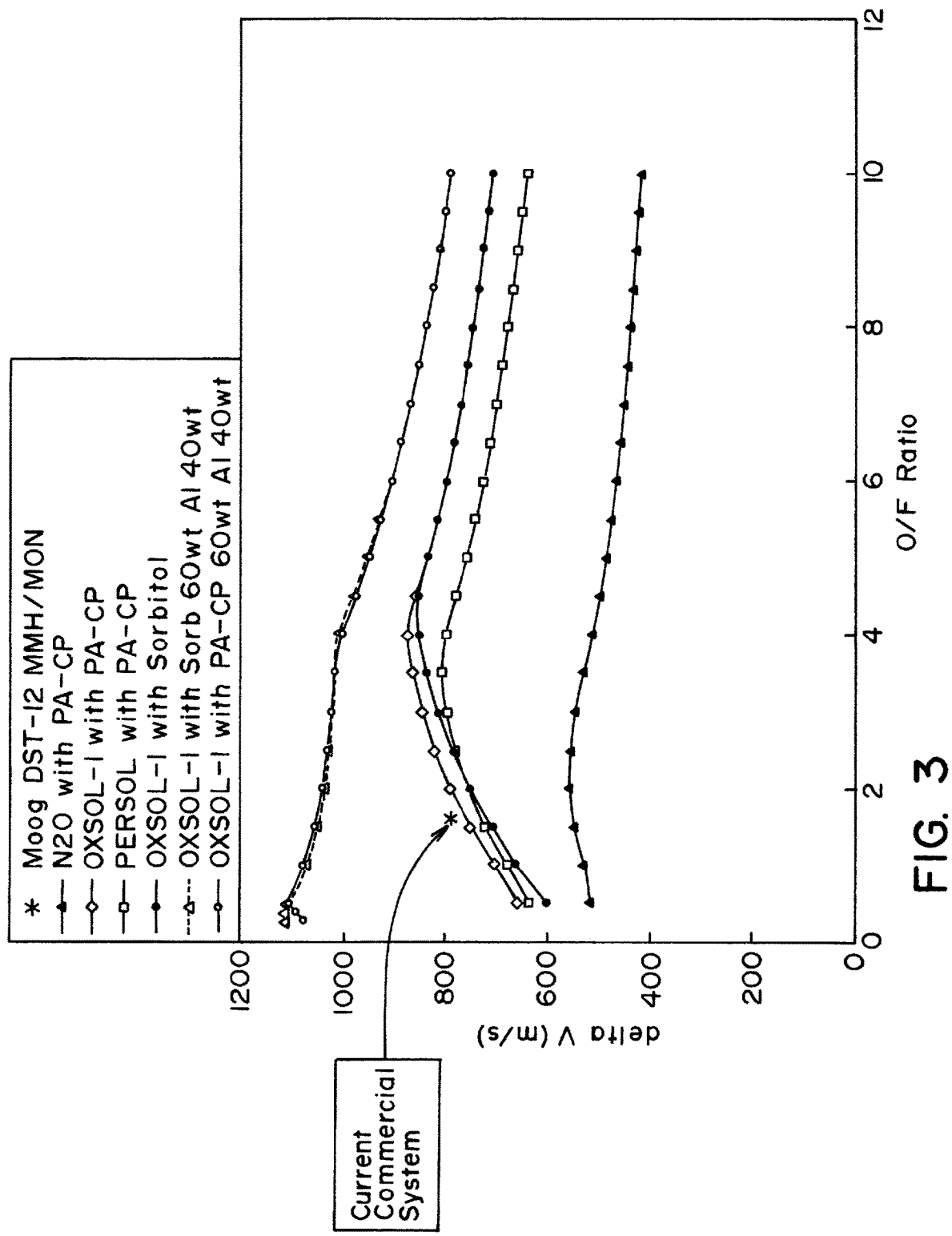
FIG. 3 is a graph directed to Delta-V performance versus O/F ratio for various high density oxidizer/fuel hybrid systems compared to state of the art upper stage bipropellant engine performance.
Figure 4:
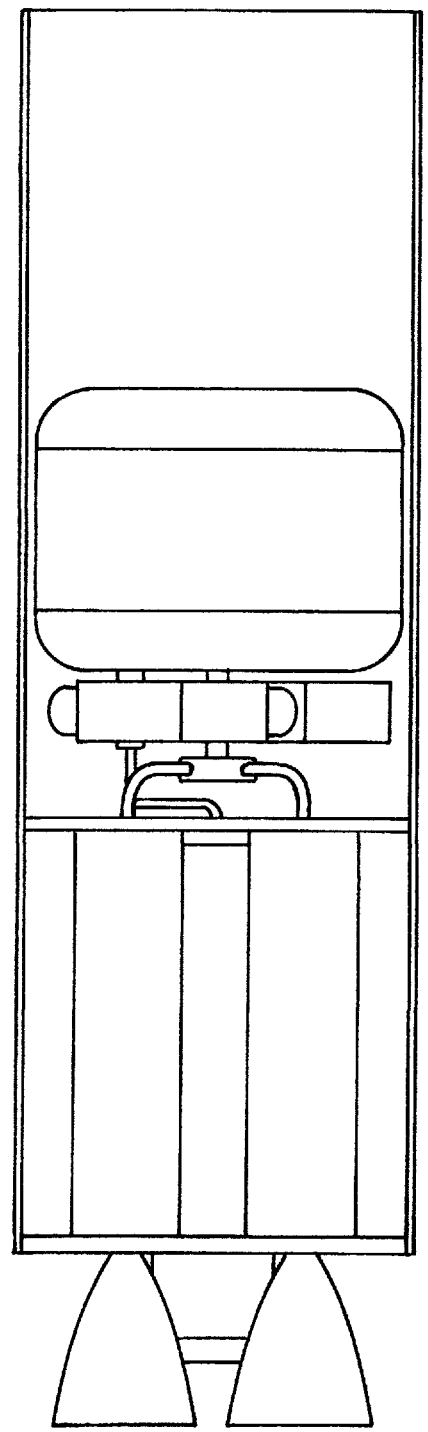
FIG. 4 illustrates a HTHB-145 stage preliminary design for functional equivalent to PSRM-120 reference design.

The present invention is related to a high density hybrid rocket motor having improved volumetric performance, and higher regression rates allows for efficient packaging and larger motors to be used. In particular, there is provided a high density hybrid rocket motor which has a density-specific impulse similar to a solid rocket motor, and with good performance.

In one non-limiting configuration, the high density hybrid motor design uses inert gas pressurized OXSOL oxidizer, and electric ignition system, and a POM (Polyoxymethylene)/40% Al fuel grain. To meet PSRM-120 (Printed solid rocket motor) delta V requirements, nominal motor volumetric requirements are 18.6 liters (4.9 gallons) of OXSOL™.

For a 16" diameter tank size, the tank needs to have a 5.7" length to accommodate the required volume. For packaging, a good design is a cylindrical tank with an internally domed head on the aft end, and an outward elliptical domed head on the top. The required volume can also be met by use of a 13" diameter spherical tank. The walls of such tanks can be at least 0.20" thick and optionally formed of magnesium or aluminum.

Slightly more than ¼" wall thickness may be required for a magnesium cylindrical case with elliptical ends for 1200 psig pressure rating (20% margin), equating to roughly 7 lbs. for the oxidizer tank, with 0.4" elliptical ends. Total inert weight for the system is estimated at 32 lbs. when using magnesium tanks and cases, an aluminum gas bottle for the He pressurizing gas, steel valves and injectors, a 5.5" carbon-phenolic nozzle and closure assembly, and graphite throat and post-combustion chamber. As can be appreciated, different materials and material thickness of one or more of the components may result in different weights.

The fuel grains can require 763 in$^3$ of volume. Such volume can translate into four 4" grains 17.5" long. These fuel grains are essentially the same volume and size of the 4" HRTM motor (3.75" grain diameter) tested with results shown in FIGS. 5 and 6. For a 500 psi rating, the wall thickness of a magnesium case is generally at least 0.045", plus insulation.

With 3/64" phenolic insulation thickness (the grain acts as insulator as well), four 3.5" motors can fit in a 10.5" scribed circle. The spacing is actually dictated by the nozzle size—within a 16" envelope, allowing for four 5.5" nozzle diameters, matching the 6" baseline design. Total mass of the four motor cases plus insulation is about 3.8 lbs fabricated from Mg alloy (1/16" wall) extrusions with phenolic insulators. Mass estimates for the carbon-phenolic closures and nozzle assemblies is about 1.4 lbs/grain (5.6 lbs total). A 5000 psig He pressurization tank can be sized to run the 24" open motor length, requiring a 5.5" diameter to result in full system volume (oxidizer tank) end point pressure of 1100 psig. The center space with the 5.5" nozzles can be nearly 7" diameter, thus plenty of space for packaging. The wall thickness for a 6" aluminum tank required for 5000 psig is about 0.4", with a pressurization tank weight of 9 lbs. with elliptical ends, including He gas content. Adding about 7 lbs. for tubing, igniter, injector plates, battery, pressurization valve and structural supports, total inert mass for the hybrid motor is about 32 lbs., matching the initial estimates based on PSRM baseline designs (38 lbs. inert motor mass plus 50 lbs. payload).

HDHB—145 Stage Design (High Density Hybrid, 145 Lbs Propellant).

Motor configuration: pressurized cylindrical oxidizer tank, four 3.5" diameter×15" cylindrical grains with pressurization tank centered between grains.

Motor total mass: 183 lbs.
Total motor inert mass: 32 lbs.
Motor diameter: 16".
Motor length: 38".
Total thrust: 36,685 lbf-sec.

This design fits within the 17"×42" volume constraint for the notional Nanolauncher design. Alternative designs, including a toroidal tank are not suitable for main thrust motor, but would be most desirable for a −30 orbital insertion motor, which would have one grain and roughly a 2 gallon tank. For a −30 design, oxidizer and pressurization tanks arranged around a central motor grain represent the (first analysis) optimal design.

Figure 6:
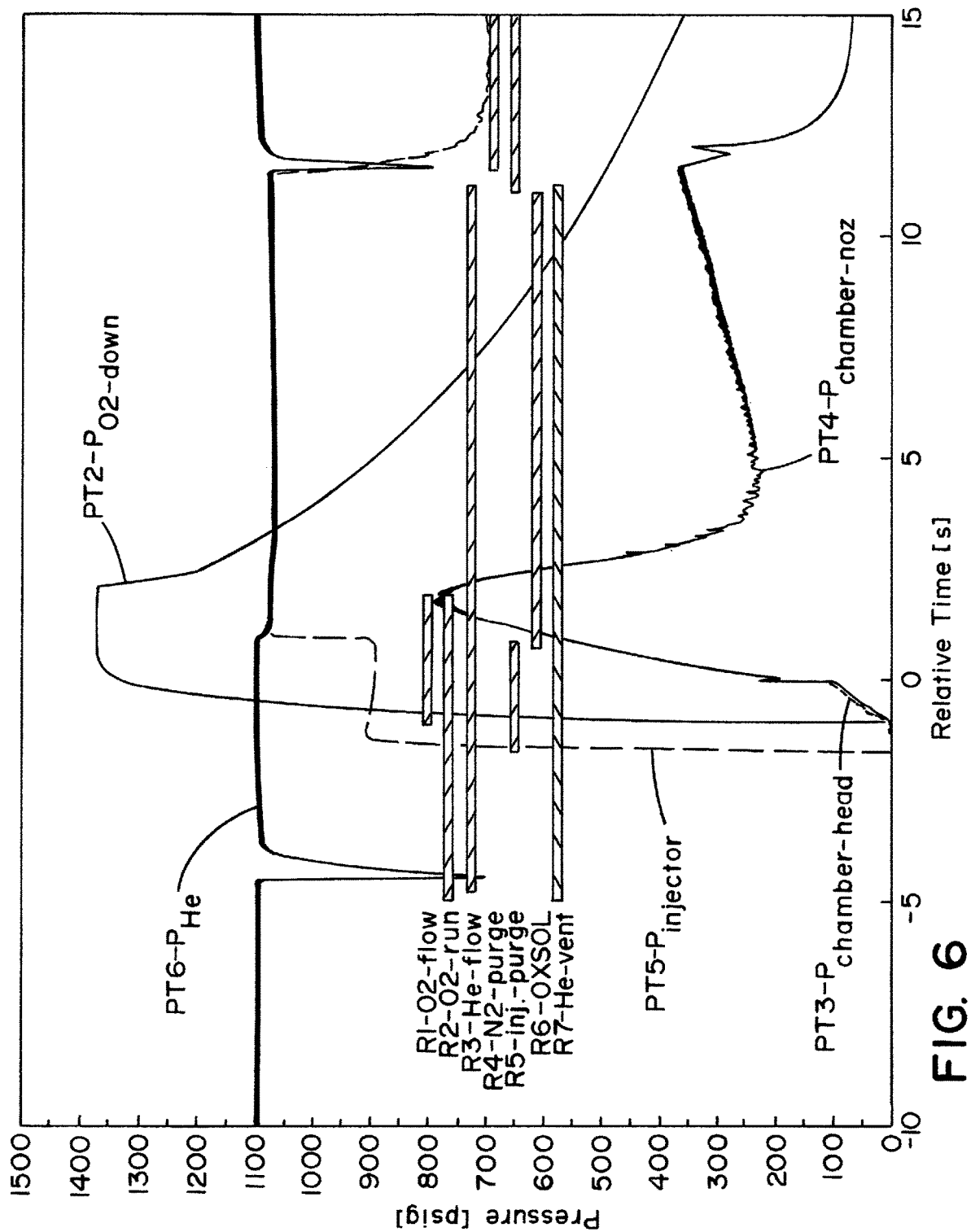
FIG. 6 illustrates a POM data plot showing stable combustion region with OXSOL and an image of firing.

FIG. 6 illustrates the overall HDHB-145 stage design.

EXAMPLE 1

A POM/Al hybrid rocket motor grain was prepared. Polyacetal motor grains were prepared by twin screw compounding followed by single screw extrusion into 3" diameter rods that were cut to 12" lengths. Polyacetal Twin screw extrusion compounding was completed on a W&P ZSK-30 with a processing profile consisting of 191° C. inlet temperature, 192-197° C. mixing zone temperature, 200° C. exit die, 103-105 rpm screw rate, and 50-60 torque. Single screw extrusion was completed at Apexco-ppsi to produce a solid fuel grain of 3" diameter directly. Grains were then adhesively bonded into the phenolic insulator tubes. Extruded rods were cut to length and epoxy cured into 0.25" thick phenolic paper tubes. ½" diameter holes were bored into the bonded fuel grains using an extended twist drill mounted on a center stock on a lathe. The fuel grain was centered using a 4-jaw chuck and the ID was bored by drilling.

Figure 5:
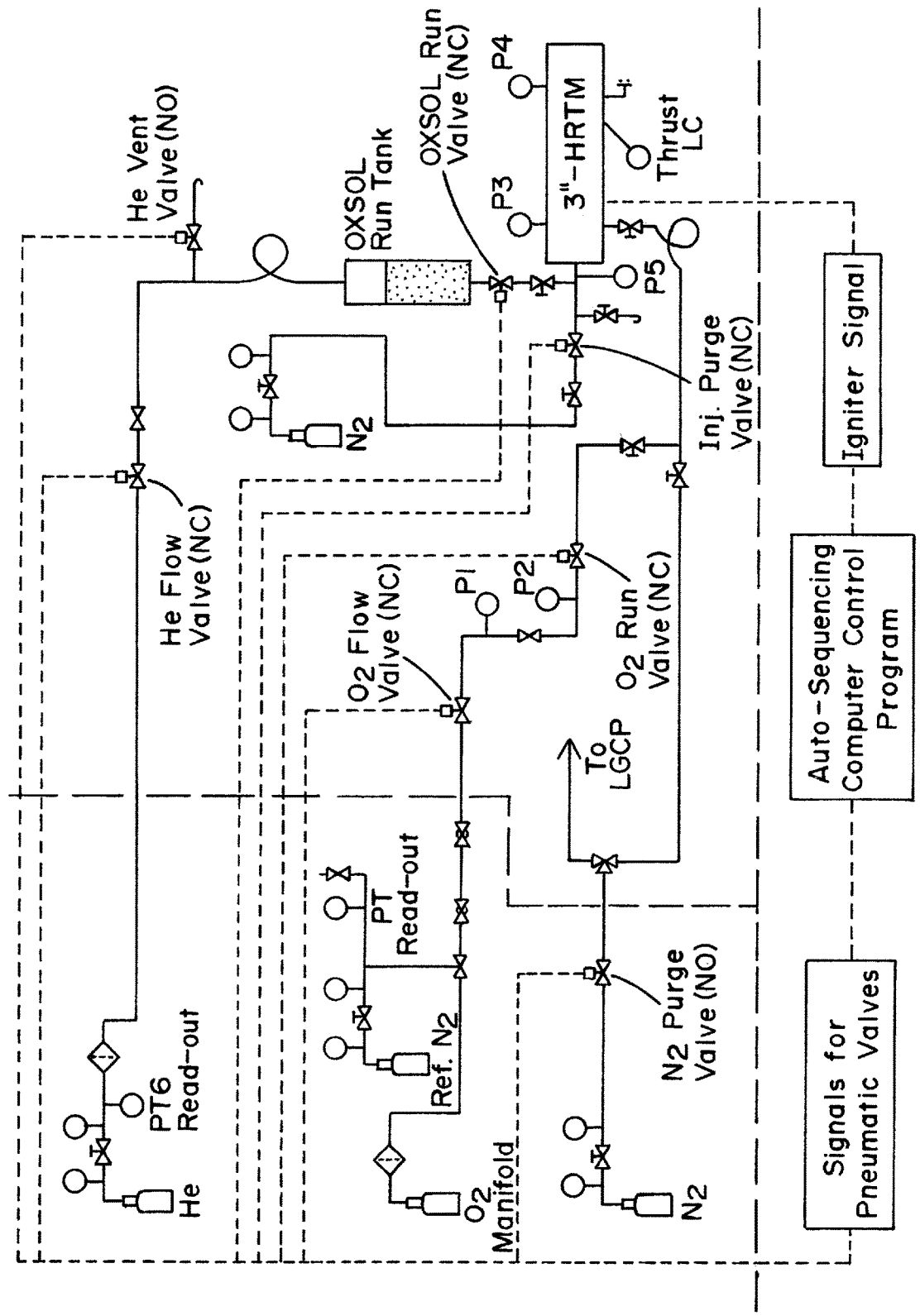
FIG. 5 illustrates a PID (piping and instrumentation diagram) and 4" HRTM (High resolution Test Motor) as modified with close-coupled liquid oxidizer blowdown system.

The fuel grains were fired in a ground (non-flight weight motor with a 4" configuration, noted as the high resolution test motor, at Penn State University. The 4" HRTM motor was modified to allow for liquid oxidizer feed, and close-coupling of the liquid oxidizer in the system to minimize $O_2$/OXSOL overlap. To ensure reliable ignition, ignition was carried out with gaseous oxygen which was switched to liquid OXSOL feed during the first half-second of the burn. The modifications included adding a storable non-volatile liquid oxidizer feed system with appropriate safety and purge features, and fabricating and installing a significantly lengthened motor pressure vessel on the Hybrid Rocket Test Motor (HRTM) to provide for an appropriate fuel grain length with pre- and post-combustion mixing regions. A Process and Instrumentation Diagram (P&ID) for the upgraded test setup is shown in FIG. 5. Gas manifolds and the control area were separated from the motor and stand by 12" reinforced concrete test cell walls. All operations are remotely sequenced and monitored from the control area. All critical pressures were recorded. The control program monitored chamber and injector pressures for under- or over-pressure conditions and automatically aborted the test to a predetermined safe shutdown mode if any of the abort criteria were met. A manual abort button was also available on-screen, and the valves and connections revert to a failsafe condition (purges on, oxidizer flow off) if system power fails totally. To maximize system responsiveness and minimize oxidizer waste (and hazard), the OXSOL run tank was mounted on the motor stand, behind a blast plate. This run tank was only pressurized (with helium) seconds before the test starts, and was immediately depressurized and vented upon test completion or abort condition triggering. The data acquisition (DAQ) system was implemented on hardware independent of the LabVIEW-driven control system so that any potential failure or unexpected configuration in the control system could be monitored; commanded valve operations and igniter signals were recorded as digital signals in addition to analog pressure transducer readings at 1 KHZ.

The motor illustrated in FIG. 5 was tested with a single 0.039" port (⅛-flow) design was used, combined with the ½" diameter initial fuel port. A series of motor firings were conducted over a range of pressures and oxidizer flow rations, using OXSOL™ as the oxidizer to validate motor performance and design calculations. At 350 psig, a full length, highly stable burn was achieved. FIG. 6 illustrates the pressure trace and valve operation for the 350 psig OXSOL-40% Al/POM burn. A full 8 second burn, with 5-6 seconds of stable OXSOL-POM combustion were achieved, and repeated at oxidizer/fuel rations ranging from 1-4. Efficiencies comparable to state of the art formulations in ground test were observed, validating the design calculations and motor performance estimates.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed:

1. A fuel that can be used for a rocket motor comprising:
 a. an oxidizer containing greater than 10 wt. % water and an ionic liquid, said ionic liquid having a density of greater than 1.3 g/cc;
 b. a fuel grain fabricated from a polymeric material with a density of at least 1.25 g/cc, said fuel grain contains about 10-50% metal fuel additions, said metal fuel additions including one or more metals selected from the group consisting of aluminum, aluminum-magnesium, magnesium, $TiH_2$, $AlMgB_{14}$, $CaB_6$, $AlB_2$, $MgB_2$, $SiB_6$, and boron.

2. The fuel as defined in claim 1, wherein said polymeric material has a density of at least about 1.35 g/cc.

3. The fuel as defined in claim 1, wherein said metal fuel additions are coated with a fluoropolymer, said coating of said fluoropolymer constituting 1-5% by weight of said metal fuel additions.

4. The fuel as defined in claim 1, said polymeric material includes one or more compounds selected from the group consisting of polyacetal, sorbitol, pentaerythritol triacrylate (PETA), polyoxymethylene (POM), polysaccharide, and high molecular weight carboxylic acid.

5. The fuel as defined in claim 1, wherein the fuel grain contains an accelerator or modifier at 0.05-5%.

6. The fuel as defined in claim 1, wherein said fuel grain includes an energetic compound that includes one or more compounds selected from glycidyl azide polymer (GAP), glycidyl nitramine polymer (polyGlyN), 3-nitratomethyl-3-methyloxetane polymer (polyNIMMO), pentaerythritol tetranitrate (PETN), hexahydro-1,3,5-trinitro-1,3,5-triazine (RDX), cyclotetramethylenetetramine (HMX), 2,4,6,8,10,12-hexanitro-2,4,6,8,10,12-hexaazaisowurtzitane (CL-20), 1,1-diamino-2,2-dinitroethylene (FOX-7), furazan-based molecules such as diaminoazoxyfurazan, nitrocellulose, 3,3-Bis(azidomethyl)oxetane (BAMO), and other nitramines.

7. The fuel as defined in claim 1, wherein said ionic liquid includes one or more compounds selected from the group consisting of hydrolxylammonium nitrate (HAN), ammonium nitrate (AN), parachlorobenzotrifluoride, and aminopyridine (AP).

8. The fuel as defined in claim 1, further including a decomposition control agent, said decomposition control agent is a hydrocarbon soluble in said AN-HAN solution.

9. The fuel as defined in claim 8, wherein said decomposition control agent includes buffering agent, sequestering agent, or combinations thereof.

10. The fuel as defined in claim 1, wherein said oxidizer includes PVA.

11. A high density hybrid rocket motor which includes:
 a. an oxidizer solution having a density greater than 1.3 g/cc and containing at least 8% water;
 b. a fuel containing an oxygen-containing polymer having a density greater than 1.3 g/cc and containing one or more compounds selected from the group consisting of sorbitol, pentaerythritol triacrylate (PETA), polyoxymethylene (POM), polysaccharide, and carboxylic acid;
 c. a powdered metal fuel additive dispersed in the fuel that includes one or more components selected from the group consisting of aluminum, aluminum-magnesium alloy, titanium, boron, metal hydrides, silicon, and borides; and,
 wherein said oxidizer solution is atomized into fuel at pressures exceeding about 200 psig.

* * * * *